May 20, 1924.

A. W. WOODWARD 1,494,659

CLAMPING MECHANISM FOR WELDERS

Filed April 17, 1920

Inventor.
Alva W. Woodward
by G. H. Ely, Atty.

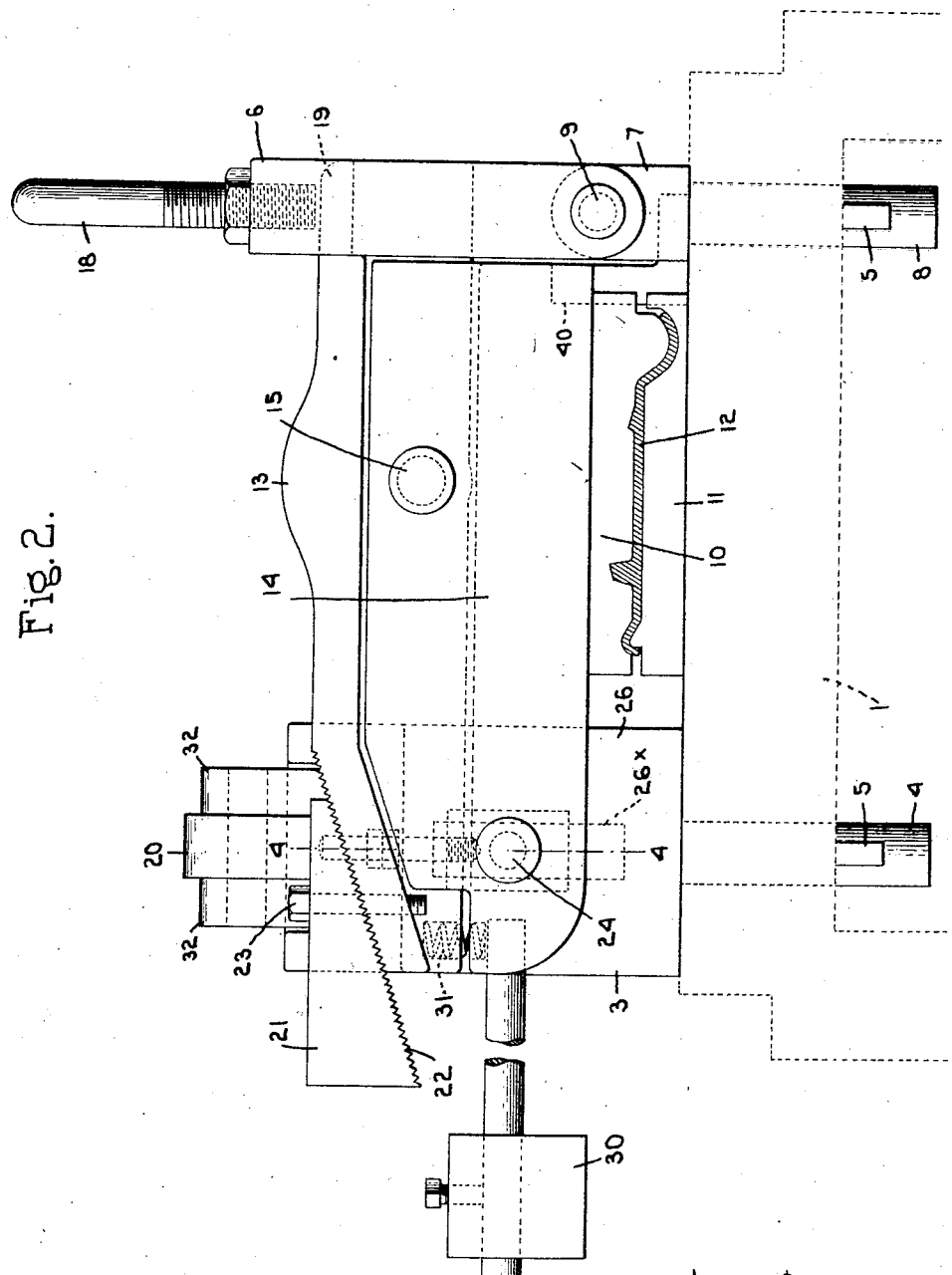

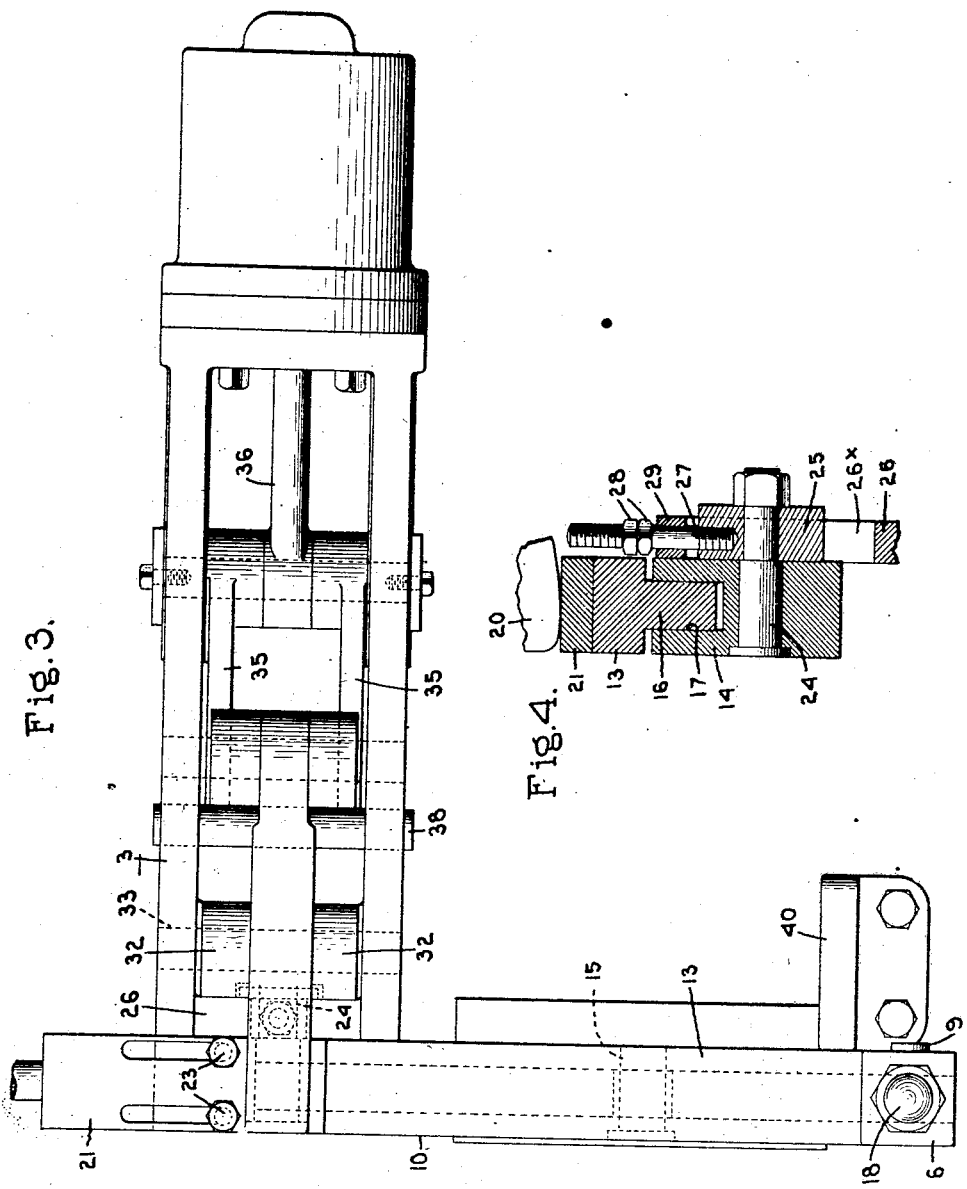

Patented May 20, 1924.

1,494,659

UNITED STATES PATENT OFFICE.

ALVA W. WOODWARD, OF AKRON, OHIO, ASSIGNOR TO THE FIRESTONE STEEL PRODUCTS COMPANY, OF AKRON, OHIO, A CORPORATION OF OHIO.

CLAMPING MECHANISM FOR WELDERS.

Application filed April 17, 1920. Serial No. 374,584.

*To all whom it may concern:*

Be it known that I, ALVA W. WOODWARD, a citizen of the United States, residing at Akron, in the county of Summit and State of Ohio, have invented certain new and useful Improvements in Clamping Mechanism for Welders, of which the following is a specification.

This invention relates to an improved clamping device for use on electric welders. In the manufacture of metallic auto rims it is necessary to weld the ends together and to securely hold the ends during the welding operation. This operation is known as butt-welding.

The apparatus which is the subject of this invention is employed to clamp such rims while they are being welded. It is designed to replace the heavy manually operated clamps at present in use on this type of machine, and to quickly and accurately clamp the ends of the metal in abutment.

Although being particularly designed for butt-welding the ends of rims, felly bands, or the like parts for the manufacture of demountable automobile rims, it is not intended to be confined to this class of work.

Other objects of the invention will more fully appear from the following description, and will be especially pointed out in the annexed claims.

In the drawings:

Fig. 2 is a side elevation of the right hand clamping attachment, an automobile rim being shown in section.

Fig. 3 is a plan view thereof.

Fig. 4 is a view taken on line 4—4, Fig. 2.

Figure 1:
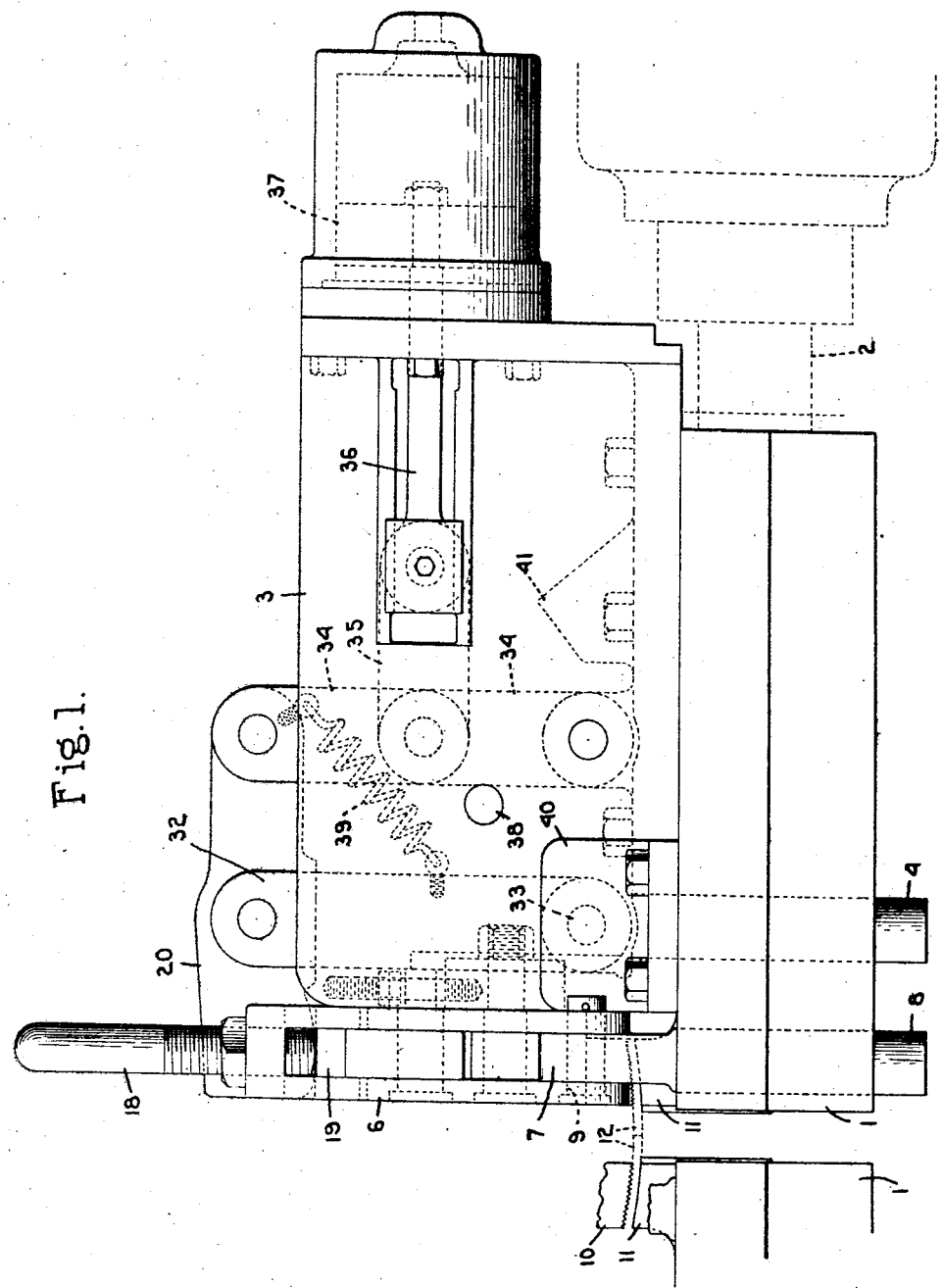
Fig. 1 is a front elevation of the clamping attachment in clamping position, the left hand portion of the machine being only partially shown.

The welder may be of any well known type having the usual platen, and generally comprises two similar mechanisms placed in juxtaposition, one right hand and one left hand, the construction being the same except for a reversal of parts. Each mechanism embodies a platen 1 upon which the clamping devices are mounted, the left hand platen being fixedly secured to the machine, and the right hand platen being slidable in suitable guideways and operated by a hydraulic ram 2.

Each device comprises a housing or bracket 3 which is secured to the platen by studs 4. A wedge 5 is used in place of the customary nuts as it is easier to tighten, only a single blow of a hammer being needed. The strain on the several parts of the device is great and causes considerable loose play which has to be taken up and it has been found that the wedge is more easily operable than a nut.

Located adjacent to the front end of the housing 3, pivoted at 9 on a boss 7, is a latch or clevis 6. The boss 7 is attached to the platen in a similar manner to the housing, before described, by a stud 8. Said clevis is intended to engage one end of the upper clamping jaw indicated generally at 10. The lower jaw is designated at 11 and is secured to the platen. As will be seen from Fig. 2, the end 12 of the piece to be welded is clamped between the two jaws.

The upper jaw 10 is of peculiar construction, the clamping surface being self-centering, thus insuring the gripping of the article at every point. It is made of two parts 13 and 14 which are pivotally secured together by a pin 15, the part 13 having a tongue portion 16 received in a groove 17 in the piece 14 to keep the parts 13 and 14 in alignment and prevent any lateral displacement of the jaw sections at the time the ends of the rim are forced together. The outward end of the part 13 is acted upon and held down by an adjustable stud 18 which is carried by the clevis 6. Stud 18 also acts as a handle to swing the clevis off and on the jaw 10. A hardened piece 19 is inserted in the end 13 to withstand the wear of the stud 18. The opposite end of the jaw is acted upon and pressed into clamping arrangement by the clamping lever 20, hereinafter described.

A wedge block 21 having a serrated under face 22 is slidably mounted on the part 13 directly under and acted upon by the lever 20, the upper face of jaw 13 having complementary serrations and an adjusting screw 23 threaded therein, said screw holding the wedge in the proper adjustment.

As will be seen from the foregoing, the pressure is applied to the upper jaw through the wedge 21, thus exerting a downward thrust on the pivotal pin 15, the projection 19 being held down by the clevis 6. The pressure on the pin 15 will be transferred to the jaw 10 pivoted thereon, the jaw 10 automatically centering itself on the material.

24 designates a pin upon which the jaw 10 swings when in an unclamped position, the jaw 10 acting independently of the pin 24 when being clamped to the material to be welded (shown in Fig. 4). Pin 24 passes through the portion 14 and is bolted to a slide 25 which slides in a slot 26ˣ formed in the forward wall 26 of the housing 3. A stud 27 having adjusting nuts 28 is anchored into the slide 24, stud 27 passing through a bridged portion 29 of the wall 26. The nuts 28 limit the downward movement of the slide when the jaw is in clamped position. A counter weight 30 serves to raise the upper jaw from the lower one after the pressure is released and the clevis 6 is swung off the projection 19. A spring 31 is inserted between two members 13 and 14 at the opposite end from the clevis and spreads the members 13 and 14 at that end, thus causing them to contract at the other, when the pressure is released, and allowing the stud 18 to be slid on or off the hardened piece 19.

The pivotal pin 24 does not restrict the movement of the jaw 10 at the time the jaw is centering itself upon the work 12. When unclamped and the clevis is released, the counter weight moves the end of the jaw 10, adjacent the clamping member 20, downward until the adjustable nuts 28 rest upon the bridge 29, after which the jaw is swung around the pin 24 in an inoperative position.

The clamping lever 20 is pinned to and oscillated on links 32 which are pivoted to the sides of the housing at 33. The rear end of the lever 20 is connected to one of a pair of toggle links 34 which are connected by links 35 to a plunger 36 actuated by a piston 37 and cylinder of any well-known construction. A pin 38 extending from side to side of the housing limits the forward movement of the toggle links and the lever 20 while an abutment 41 limits its rearward movement. A tension spring 39 is connected to the link 32 and to the rear end of clamping member 20, and assists in keeping the toggle broken and the outer end of the clamping member 20 raised until it has reached its furthermost lateral position.

A bracket 40 fastened to the platen and bearing against the outer end of the jaw 10 prevents any dislocation of that member which might develop from the squeezing operation.

The operation of this device is simple and it efficiently accomplishes its functions even in the hands of an unskilled operator. A rim section, or other part, being ready for welding, the ends are placed in abutment on the lower jaws 11, the upper jaws 10 are locked about the pivots 24 into clamping position, and the clevises 6 are swung over the projections 19 on the upper portion of the jaws 10 causing the blocks 25 and the pin 24 to be slightly elevated. The pressure is then turned into the cylinder 37 and by means of the links 32 and the toggles 34, the clamping member 20 is moved forward over the wedge 21. Still further movement of the piston straightens the toggle connection and clamps the lever 20 onto the block 21 which transmits the hydraulic pressure to the member 14 and moves the block 25 and pin 24 downwardly, thus gripping the ends of the rim firmly between the jaws. When the welding is completed, the piston is withdrawn and the clevises are removed from the upper jaws. The upper jaws then swing about the centers 24 and the rim is removed from the machine.

It will be readily understood from the foregoing description that the clamping devices are competent to handle material of various shapes and thicknesses, the adjustable stud 18, the wedge 21, and the adjusting nuts 28 compensating for the variations.

It will be noted that the jaw 10 is what might be termed a floating jaw, i. e. it is freely movable over the lower jaw 11 and it is intended to adjust itself upon the work before the clamping pressure is applied. It also will be noted that the block 25 and the pivot 24 of the clamping jaw is allowed a certain vertical play. When the pin operates as the pivot point for the jaws its position is determined by the location of the nuts 28. When pressure is applied to the outer end of the arm 13 by the clamp 18, the pin 24 may rise. When pressure is applied by the lever 20, the pin will be lowered until the work is securely clamped in position.

The foregoing detailed description has been given for clearness of understanding only and no unnecessary limitation should be understood therefrom, many changes in form and construction may be made without departing from the spirit of the invention within the scope of the appended claims.

I claim:

1. A clamping device for electric welders comprising an upper and lower member, a work engaging surface on the lower member, a pivoted connection between the two said members, a pivot extending through the lower member about which both said members are movable and a clamp engaging one of said members.

2. A clamping device for electric welders comprising an upper and lower member, a work engaging surface on the lower member, a pivoted connection between the two said members, a pivot on the lower member about which both said members are movable and a clamping device engageable with the upper member.

3. A clamping device for electric welders comprising an upper and lower member, a work engaging surface on the lower member, a pivoted connection between the two said members, a pivot on the lower member about which both said members are movable, a clamping device engageable with the upper member and a spring between the two said members.

4. A clamping device comprising a support, a stationary jaw mounted thereon, a second jaw above said stationary jaw, and said second jaw being pivoted in a movable slide on said support.

5. A clamping device comprising a support, a stationary work support mounted thereon, a clamping arm over said work support, and a pivotally mounted clevis carried by said first named support adapted to hold one end of the arm in clamping position, and means operating upon the other end of the arm to automatically force said arm onto the work support.

6. A clamping device comprising a support, a stationary work support mounted thereon, a clamping arm over said work support, a pivotally mounted clevis carried by said first named support adapted to hold the arm in clamping position, and means independent of the clevis to automatically force said arm onto the work support after the clevis is in locking position.

7. A clamping device for electric welders comprising a stationary work support, and a two-part clamping arm said clamping arm being pivotally mounted over the support, the two parts of the arm being pivoted together independently of the first named pivot.

8. A clamping device comprising a support, a stationary work support mounted thereon, a clamping arm over the work support, a clevis pivoted to said first named support, and adjustable means carried by said clevis adapted to engage said arm and hold it in clamping position.

9. A clamping device comprising a stationary work support, a clamping arm, pressure means to force said arm onto the work support and an adjustable wedge between said pressure means and said clamping arm.

10. A clamping device comprising a stationary work support, a clamping arm over said work support, a pivotally mounted clevis adapted to swing over one end of the clamping arm, and a power-operated pressure means to operate on the other end of said clamping arm.

11. A clamping device comprising a stationary work support, a pivoted clamping arm over said work support, a movable mounting for said pivot, a clevis adapted to engage the arm and hold it in clamping position, means to exert pressure on the arm over the pivot and means to move said clamping arm away from said work support when the clevis is removed.

12. A clamping device comprising a stationary work support, a clamping arm over the work support, and means for forcing the arm onto the work support, said means moving away from said arm after release of said clamping arm.

13. A clamping device comprising a work supporting jaw, a clamping arm over said jaw, a pressure means having sliding engagement with said clamping arm adapted to force said arm on the work supporting jaw.

14. A clamping device comprising a work supporting jaw, a clamping arm over said jaw, a pressure means independent of said clamping arm adapted to force said arm on the work supporting jaw, and a toggle mechanism attached to said pressure means.

15. A clamping device comprising a stationary work support, a clamping arm, a jaw pivoted to said clamping arm, said arm being adjustable vertically, and a power-operated pressure means to force the arm toward the work support.

16. A clamping device comprising a stationary support, a clamping arm, a jaw pivoted to said clamping arm, said arm being adjustable vertically, and a pressure means to force the arm toward the work support, and a toggle mechanism attached to said pressure means.

17. A clamping device for electric welders comprising a clamping jaw, a pivot pin for said jaw, a block having a limited vertical movement carrying said pin, means to secure the end of the jaw, and means acting on the jaw above the pivot point to exert a clamping pressure thereon.

18. A clamping device for electric welders comprising a clamping jaw, a pivot pin for said jaw, a block having a limited vertical movement carrying said pin, means to secure the end of the jaw, and hydraulic pressure means acting on the jaw above the pivot point to exert a clamping pressure thereon.

ALVA W. WOODWARD.